(12) United States Patent
Fujishiro et al.

(10) Patent No.: US 11,546,818 B2
(45) Date of Patent: Jan. 3, 2023

(54) CELL RESELECTION CONTROL METHOD

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 60 days.

(21) Appl. No.: 17/036,180

(22) Filed: Sep. 29, 2020

(65) Prior Publication Data

US 2021/0014757 A1 Jan. 14, 2021

Related U.S. Application Data

(63) Continuation of application No. PCT/JP2019/015034, filed on Apr. 4, 2019.

(60) Provisional application No. 62/652,989, filed on Apr. 5, 2018.

(51) Int. Cl.
*H04W 36/08* (2009.01)
*H04W 36/38* (2009.01)
*H04W 48/20* (2009.01)
*H04W 48/16* (2009.01)
*H04W 36/22* (2009.01)
*H04W 36/30* (2009.01)
*H04W 48/02* (2009.01)
*H04W 36/00* (2009.01)
*H04W 48/06* (2009.01)

(52) U.S. Cl.
CPC .......... *H04W 36/08* (2013.01); *H04W 36/38* (2013.01); *H04W 36/00837* (2018.08); *H04W 36/22* (2013.01); *H04W 36/30* (2013.01); *H04W 48/02* (2013.01); *H04W 48/06* (2013.01); *H04W 48/16* (2013.01); *H04W 48/20* (2013.01)

(58) Field of Classification Search
CPC ..... H04W 36/08; H04W 48/20; H04W 48/16; H04W 36/30; H04W 36/00837; H04W 36/22; H04W 28/08; H04W 48/02; H04W 48/06
See application file for complete search history.

(56) References Cited

U.S. PATENT DOCUMENTS

| | | | |
|---|---|---|---|
| 9,883,428 B2* | 1/2018 | Uemura | H04W 36/0083 |
| 2011/0039558 A1* | 2/2011 | Lee | H04W 48/20 |
| | | | 455/434 |
| 2015/0117410 A1* | 4/2015 | Wu | H04W 36/0069 |
| | | | 370/329 |
| 2018/0249383 A1* | 8/2018 | Martin | H04W 36/0061 |
| 2019/0289504 A1* | 9/2019 | Kim | H04W 36/00 |

* cited by examiner

*Primary Examiner* — Jaime M Holliday
(74) *Attorney, Agent, or Firm* — Studebaker & Brackett PC

(57) ABSTRACT

A cell reselection control method according to an embodiment comprises transmitting, by a base station configured to manage a cell having a first coverage and a second coverage as a portion enhanced more than the first coverage, to a radio terminal under the cell, a reselection instruction that instructs to reselect a neighboring cell different from the cell, and reselecting, by the radio terminal, the neighboring cell according to the reselection instruction when the radio terminal is in the second coverage.

10 Claims, 11 Drawing Sheets

CELL RESELECTION CONTROL METHOD

RELATED APPLICATIONS

The present application is a continuation based on PCT Application No. PCT/JP2019/015034, filed on Apr. 4, 2019, which claims the benefit of U.S. Provisional Application No. 62/652,989 (filed on Apr. 5, 2018). The content of which is incorporated by reference herein in their entirety.

TECHNICAL FIELD

The present invention relates to a cell reselection control method in a mobile communication system.

BACKGROUND ART

In recent years, a radio terminal targeting machine type communication (MTC) and internet of things (IoT) services that perform communication without human intervention have attracted attention. Such a radio terminal is required to realize cost reduction, coverage enhancement, and low power consumption.

For this reason, in 3rd generation partnership project (3GPP), a category of a new radio terminal of which transmission/reception bandwidth is limited only to a part of the system transmission/reception band has been specified. A coverage enhancement function including repetition and the like is applied to the radio terminal of such a new category.

The enhanced coverage function increases a load on a cell due to the repetition or the like. Therefore, when there are many radio terminals in an RRC idle mode in the enhanced coverage that is a part enhanced by the enhanced coverage function, the load on the cell due to transmission and reception of paging or the like is increased. When the load on the cell is excessive, access restrictions may be considered to be set for the cell, but since the radio terminal cannot select the cell as a serving cell, communication failure of many radio terminals may occur.

SUMMARY

A cell reselection control method according to an embodiment comprises transmitting, by a base station configured to manage a cell having a first coverage and a second coverage as a portion enhanced more than the first coverage, to a radio terminal under the cell, a reselection instruction that instructs to reselect a neighboring cell different from the cell, and reselecting, by the radio terminal, the neighboring cell according to the reselection instruction when the radio terminal is in the second coverage.

A cell reselection control method according to an embodiment comprises transmitting, by a base station configured to manage a cell having a first coverage and a second coverage as a portion enhanced more than the first coverage, intra-frequency reselection information indicating that a reselection of a neighboring cell belonging to a same frequency as a frequency of the cell is not allowed to be performed during an access restriction when the access restriction to the cell is set, reselecting, by a radio terminal in an RRC idle mode which is in the second coverage, the neighboring cell belonging to the same frequency as the frequency of the cell regardless of the intra-frequency reselection information, even when the radio terminal receives the intra-frequency reselection information.

A cell reselection control method according to an embodiment comprises transmitting, by a base station configured to manage a cell having a first coverage and a second coverage as a portion enhanced more than the first coverage, as separate information, first intra-frequency reselection information for a first radio terminal that is in the first coverage and second intra-frequency reselection information for a second radio terminal that is in the second coverage when an access restriction to the cell is set, and determining, by the second radio terminal, whether or not a reselection of the neighboring cell belonging to a same frequency as a frequency of the cell is allowed to be performed during the access restriction based on the received second intra-frequency reselection information when the second radio terminal receives the second intra-frequency reselection information.

DESCRIPTION OF EMBODIMENTS

First Embodiment (Mobile Communication System)

Figure 1:
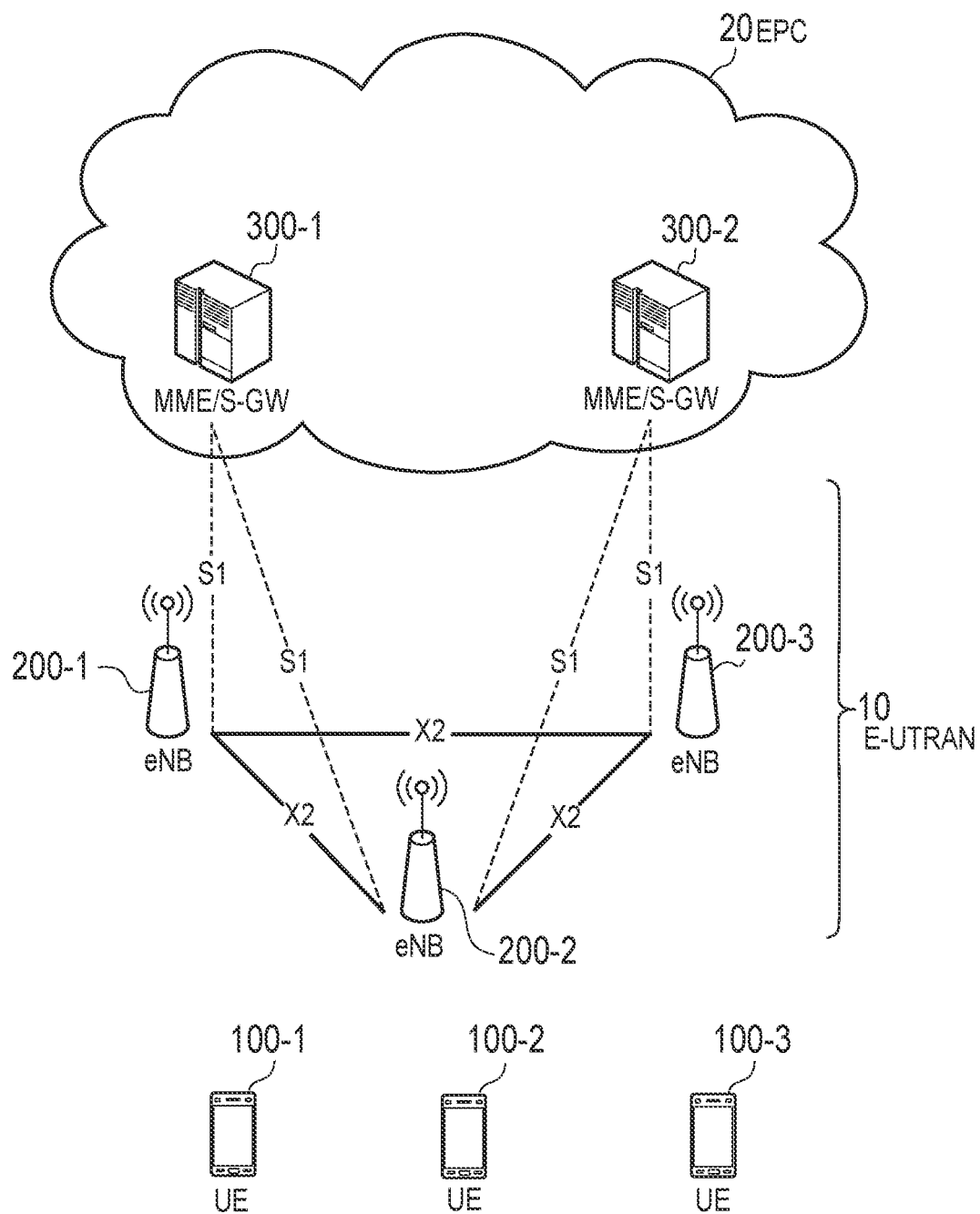
FIG. 1 is a diagram illustrating a configuration of an LTE system (mobile communication system) according to an embodiment.

A configuration of a mobile communication system according to a first embodiment will be described. FIG. 1 is a diagram illustrating a configuration of a long term evolution (LTE) system that is the mobile communication system according to the first embodiment. The LTE system is a mobile communication system based on the 3GPP standard.

The LTE system includes a radio terminal (user equipment: UE) 100, a radio access network (evolved-UMTS terrestrial radio access network: E-UTRAN) 10, and a core network (evolved packet core: EPC) 20.

The UE 100 is a mobile type communication apparatus. The UE 100 performs radio communication with an eNB 200 that manages a cell (serving cell) in which the UE 100 exists.

The E-UTRAN 10 includes base stations (evolved Node-B: eNB) 200. The eNBs 200 are connected to each other via an X2 interface. The eNB 200 manages one or a plurality of cells. The eNB 200 performs radio communication with the UE 100 which sets up the connection with the own cell. The eNB 200 has a radio resource management (RRM) function, a routing function of user data (hereinafter, simply referred to as "data"), a measurement control function for mobility control and scheduling, and the like. The "cell" is used as a term that indicates a smallest unit of a radio communication area. The "cell" may also be used as a term that indicates a function of performing the radio communication with the UE 100 or a resource. One cell belongs to one carrier frequency.

The EPC 20 includes mobility management entity (MME) and a serving gateway (S-GW) 300. The MME performs various mobility controls and the like on the UE 100. The MME manages information on a tracking area (TA) in which the UE 100 exists by communicating with the UE 100 using non-access stratum (NAS) signaling. The tracking area is an area composed of a plurality of cells. The S-GW performs a data transfer control. The MME and the S-GW are connected to the eNB 200 via an S1 interface.

Figure 2:
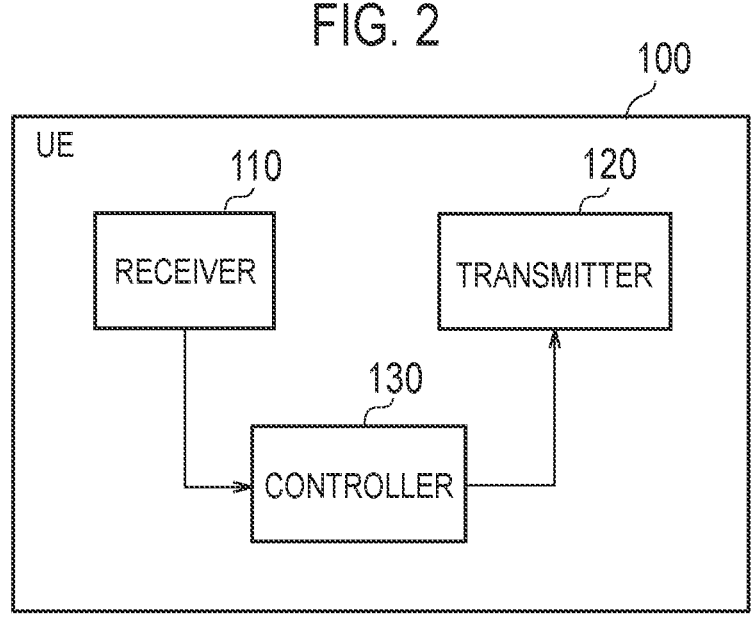
FIG. 2 is a diagram illustrating a configuration of a UE (radio terminal) according to the embodiment.

FIG. 2 is a diagram illustrating a configuration of the UE 100 (radio terminal). The UE 100 includes a receiver 110, a transmitter 120, and a controller 130.

The receiver 110 performs various types of receptions under control of the controller 130. The receiver 110 includes an antenna and a receiver. The receiver converts a radio signal received by the antenna into a baseband signal (received signal) and outputs the baseband signal to the controller 130.

The transmitter 120 performs various types of transmissions under the control of the controller 130. The transmitter 120 includes an antenna and a transmitter. The transmitter converts the baseband signal (transmitted signal) output from the controller 130 into a radio signal and transmits the radio signal from the antenna.

The controller 130 performs various controls in the UE 100. The controller 130 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs various types of processing by executing programs stored in the memory. The processor executes processing to be described later.

Figure 3:
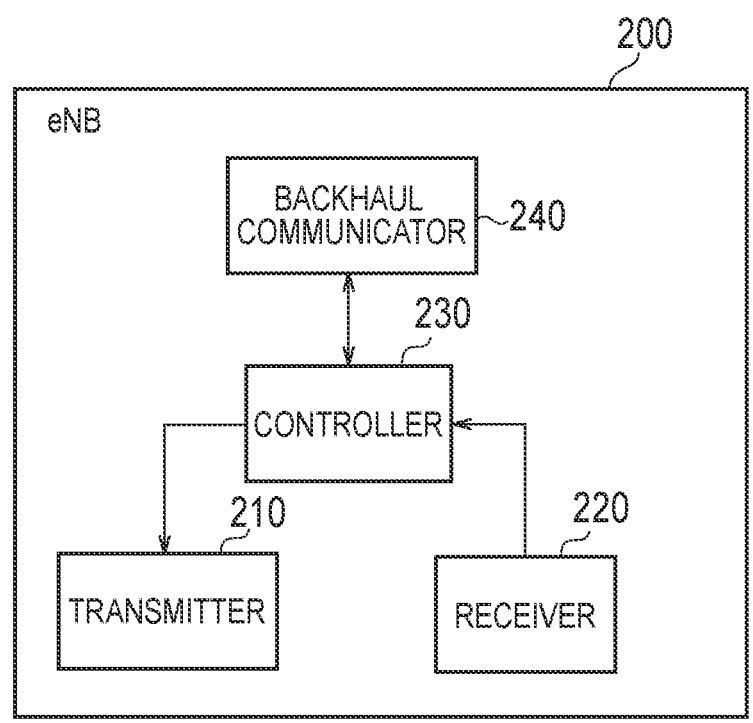
FIG. 3 is a diagram illustrating a configuration of an eNB (base station) according to the embodiment.

FIG. 3 is a diagram illustrating a configuration of the eNB 200 (base station). The eNB 200 includes a transmitter 210, a receiver 220, a controller 230, and a backhaul communication unit 240.

The transmitter 210 performs various types of transmissions under the control of the controller 230. The transmitter 210 includes an antenna and a transmitter. The transmitter converts the baseband signal (transmitted signal) output from the controller 230 into a radio signal and transmits the radio signal from the antenna.

The receiver 220 performs various types of receptions under the control of the controller 230. The receiver 220 includes an antenna and a receiver. The receiver converts a radio signal received by the antenna into a baseband signal (received signal) and outputs the baseband signal to the controller 230.

The controller 230 performs various types of controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs various types of processing by executing programs stored in the memory. The processor executes processing to be described later.

The backhaul communication unit 240 is connected to an adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
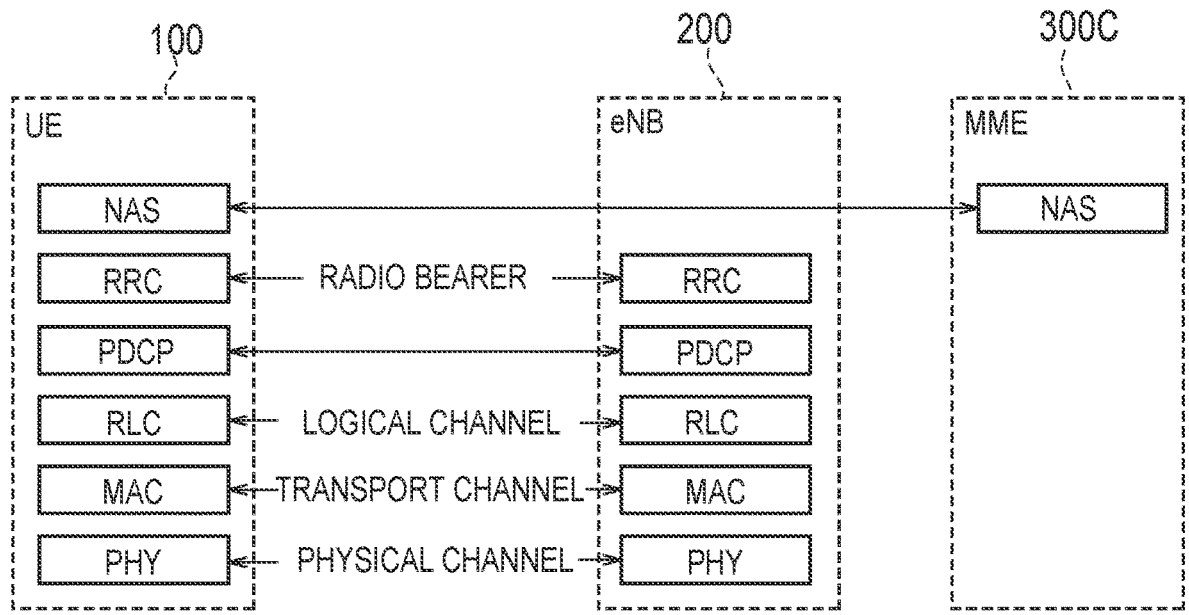
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs priority control of data, retransmission processing by hybrid ARQ (HARQ), a random access procedure, and the like. The data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and encoding scheme (MCS)) and a resource block allocated to the UE 100.

The RLC layer transmits data to an RLC layer on a receiving side using the functions of the MAC layer and the PHY layer. The data and control information are transmitted between the RLC layer of the UE 100 and the RLC layer of the eNB 200 via a logical channel.

The PDCP layer performs header compression/enhancement and encoding/decoding.

The RRC layer is defined only in a control plane that handles the control information. The RRC signaling for various configurations is transmitted between the RRC layer of the UE 100 and the RRC layer of the eNB 200. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

A NAS layer located above the RRC layer performs session management, mobility management, and the like. NAS signaling is transmitted between a NAS layer of the UE 100 and a NAS layer of MME 300C. The UE 100 has functions such as an application layer in addition to a radio interface protocol.

Figure 5:
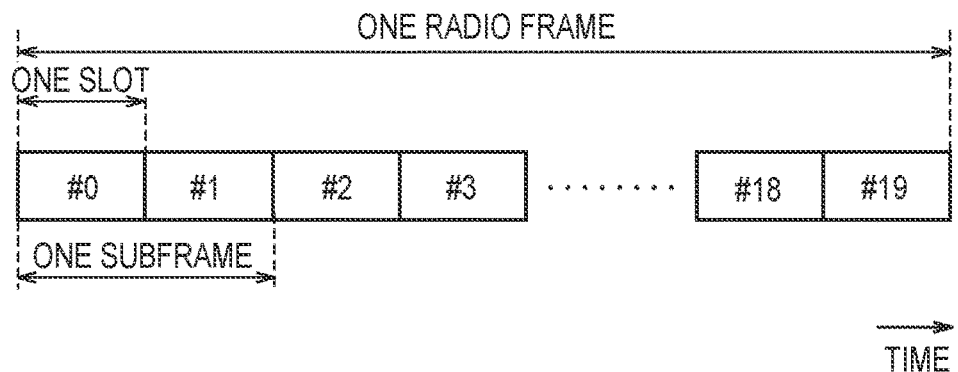
FIG. 5 is a diagram illustrating a configuration of a radio frame in the LTE system according to the embodiment.

FIG. 5 is a diagram illustrating a configuration of a radio frame used in the LTE system. The radio frame is composed of 10 subframes on a time base. Each subframe is composed of two slots on the time base. Lengths of each subframe are 1 ms. The lengths of each slot are 0.5 ms. Each subframe includes a plurality of resource blocks (RBs) on a frequency base. Each subframe includes a plurality of symbols on the time base. Each resource block includes a plurality of subcarriers on the frequency base. Specifically, one RB is composed of 12 subcarriers and one slot. One resource element (RE) is composed of one symbol and one subcarrier. Of the radio resources (time/frequency resources) allocated to the UE 100, a frequency resource can be specified by a resource block, and a time resource can be specified by a subframe (or slot).

In the downlink, a section of several head symbols of each subframe is an area which can be used as a physical downlink control channel (PDCCH) for mainly transmitting downlink control information. The remaining part of each subframe is an area which can be used as a physical downlink shared channel (PDSCH) for mainly transmitting downlink data.

In the uplink, both end portions in the frequency direction in each subframe is an area which can be used as a physical uplink control channel (PUCCH) for mainly transmitting uplink control information. The remaining part of each subframe is an area which can be used as a physical uplink shared channel (PUSCH) for mainly transmitting uplink data.

(Overview of Cell Reselection)

An outline of the cell reselection operation will be described. When the start conditions are satisfied, the UE 100 in the RRC idle mode measures quality of cells neighboring to a current serving cell, and selects a cell to be used as a serving cell from cells satisfying the selection condition.

First, the start conditions are as indicated below.

(A1) A frequency having a higher priority than that of a frequency of the current serving cell:

The UE 100 always measures the quality of the frequency having the higher priority.

(A2) A frequency having a priority equal to or lower than that of the frequency of the current serving cell:

The UE 100 measures the quality of the frequency having the equal or lower priority when the quality of the current serving cell falls below a predetermined threshold.

Second, the selection conditions are as indicated below.

(B1) The priority of the frequency of the neighboring cell is higher than that of the current serving cell:

The UE 100 selects a cell satisfying the relationship of Squal>ThreshX, HighQ over a predetermined period (TreselectionRAT) or a cell satisfying the relationship of Srxlev>ThreshX, HighP over a predetermined period (TreselectionRAT). In such a case, the criteria to be satisfied by the neighboring cell may be referred to as "S-criteria".

The Squal represents a cell selection quality level. The Squal is calculated by Squal=Qqualmeas−(Qqualmin+Qqualminoffset)−Qoffsettemp. The Qqualmeas is a quality level (RSRQ) of the neighboring cell. The Qqualmin is a minimum required quality level. The Qqualminoffset is a predetermined offset constantly applied to the neighboring cell. The Qoffsettemp is an offset temporarily applied to the neighboring cell. The ThreshX and HighQ are predetermined thresholds.

The Srxlev represents a cell selection reception level. The Srxlev is calculated by Srxlev=Qrxlevmeas−(Qrxlevmin+Qrxlevminoffset)−Pcompensation−Qoffsettemp. The Qrxlevmeas is the reception level (RSRP) of the neighboring cell. The Qrxlevmin is the minimum required reception level. The Qrxlevminoffset is the predetermined offset constantly applied to the neighboring cell. The Pcompensation is a parameter related to uplink capability. The Qoffsettemp is an offset temporarily applied to the neighboring cell. The ThreshX and HighP are predetermined thresholds.

(B2) The priority of the frequency of the neighboring cell is equal to that of the current serving cell:

The UE 100 calculates a ranking Rs of the current serving cell and a ranking Rn of the neighboring cells. The UE 100 selects, as a target cell, a cell having the ranking Rn higher than Rs over a predetermined period (TreselectionRAT). In such a case, the criteria to be satisfied by the neighboring cell may be referred to as "R-criteria".

The Rs is calculated by Rs=Qmeas, s+QHyst−Qoffsettemp. The Rn is calculated by Rn=Qmeas, n−Qoffset−Qoffsettemp. The Qmeas, s is the reception level (RSRP) of the current serving cell. The Qmeas, n is the reception level (RSRP) of the neighboring cell. The QHyst is a hysteresis value to easily reselect the current serving cell as a target cell. The Qoffsettemp is an offset temporarily applied to the current serving cell and neighboring cells.

(B3) The priority of the frequency of the neighboring cell is lower than that of the current serving cell:

The UE 100 selects the target cell from the neighboring cells by the same method as the above-described (B1), under the assumption that Squal<ThreshServing, LowQ is satisfied over a predetermined period (TreselectionRAT) or Srxlev<ThreshServing, LowP is satisfied over the predetermined period (TreselectionRAT).

However, the ThreshServing, LowQ and the ThreshServing, LowP are predetermined thresholds, similarly to the ThreshX, HighQ and the ThreshX, HighP.

Various parameters used for selecting a target cell are included in information (system information block (SIB)) broadcast from the eNB 200. Various parameters include a priority (cellReselectionPriority) of a frequency, a predetermined period (TreselectionRAT), various offsets (Qqualminoffset, Qrxlevminoffset, Qoffsettemp, QHyst, Qoffset), various thresholds (ThreshX, HighQ, ThreshX, HighP, ThreshServing, LowQ, ThreshServing, LowP).

(Overview of eMTC and NB-IoT)

An overview of eMTC and NB-IoT will be described. In the first embodiment, a scenario is assumed in which there is a new category UE 100 targeting the MTC and IoT services. A new category UE 100 is a UE 100 in which transmission/reception bandwidth is limited only to a part of a system transmission/reception band (LTE transmission/reception bandwidth). The new category UE is referred to as, for example, category M1 and category narrow band (NB)-IoT. The category M1 is a category to which an enhanced machine type communications (eMTC) UE belongs. The category NB-IoT (category NB1) is a category to which the NB-IoT UE belongs. A category M1 limits the transmission/reception bandwidth of the UE 100 (eMTC UE) to, for example, 1.08 MHz (that is, bandwidth of 6 resource blocks). The category NB-IoT (category NB1) further limits the transmission/reception bandwidth of the UE 100 (NB-IoT UE) to 180 kHz (that is, bandwidth of one resource block). By the narrowing of the bandwidth, it is possible to realize cost reduction and power consumption required for the eMTC UE and the NB-IoT UE.

Figure 6:
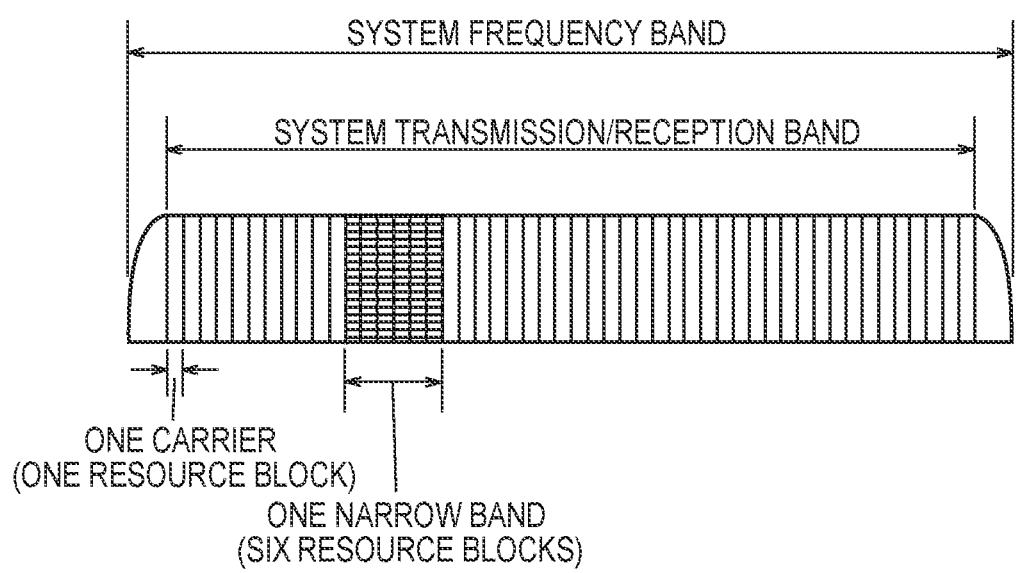
FIG. 6 is a diagram illustrating a frequency channel handled by an eMTC UE and an NB-IoT UE.

FIG. 6 is a diagram illustrating a frequency channel handled by the eMTC UE and the NB-IoT UE. As illustrated in FIG. 6, a frequency bandwidth of a system frequency band of the LTE system may be 10 MHz. The bandwidth of the system transmission/reception bandwidth is, for example, 50 resource blocks=9 MHz. The bandwidth of the frequency channel that is available by the eMTC UE is within 6 resource blocks=1.08 MHz. The frequency channel within 6 resource blocks that is available by the eMTC UE is referred to as a "narrow band (NB)". The bandwidth of the frequency channel that is available by the NB-IoT UE is 1 resource block=180 kHz. The frequency channel of 1 resource block that is available by the NB-IoT UE is referred to as a "carrier".

The eMTC UE is operated within the LTE transmission/reception bandwidth. The NB-IoT UE supports a form operated within the LTE transmission/reception bandwidth, a form operated in a guard band outside the LTE transmission/reception bandwidth, and a form operated within the frequency band dedicated to the NB-IoT.

The eMTC UE and the NB-IoT UE support an enhanced coverage (EC) function using repeated transmission or the like in order to realize coverage enhancement. Note that the enhanced coverage is sometimes referred to as coverage enhancement (CE). The coverage enhancement function may include repetition that repeats the same signal using a plurality of subframes. The coverage can be enhanced as the number of times of repetitions increases. The coverage enhancement function may include power boosting that increases a power density of the transmitted signal. As an example, the power density increases by narrowband transmission that narrows the frequency bandwidth of the transmitted signal. The coverage can be enhanced as the power density of the transmitted signal is increased. The coverage enhancement function may include lower MCS transmission that lowers the MCS used for the transmitted signal. The coverage can be enhanced by performing transmission using MCS with a low data rate and high error tolerance.

When first cell selection criteria (first S-criteria) for normal coverage are not satisfied and second cell selection criteria (second S-criteria) for enhanced coverage are satisfied, the eMTC UE and the NB-Iot UE in the RRC idle mode may determine that the eMTC UE and the UE are in the enhanced coverage. The "UE in enhanced coverage" may mean a UE that needs to use the coverage enhancement function (enhanced coverage mode) to access a cell.

The coverage enhancement function may have a plurality of coverage enhancement levels having different degrees of coverage enhancement. The eMTC UE and the NB-IoT UE determine their coverage enhancement levels by measuring the reference signal received power (RSRP) and comparing the measured RSRP with RSRP thresholds for each coverage enhancement level. The coverage enhancement level is associated with at least the number of times of transmissions (that is, the number of times of repetitions) in the repetition.

The UE in the enhanced coverage performs the cell reselection by ranking based on the reception level (RSRP) regardless of the priority of the frequency in the cell reselection described above. For example, the UE calculates the ranking Rs of the current serving cell and the ranking Rn of the neighboring cells, and selects, as a target cell (new serving cell), the cell having the ranking Rn higher than the Rs over the predetermined period (TreselectionRAT).

(Cell Reselection Control Method According to First Embodiment)

The cell reselection control method according to the first embodiment will be described.

Figure 7:
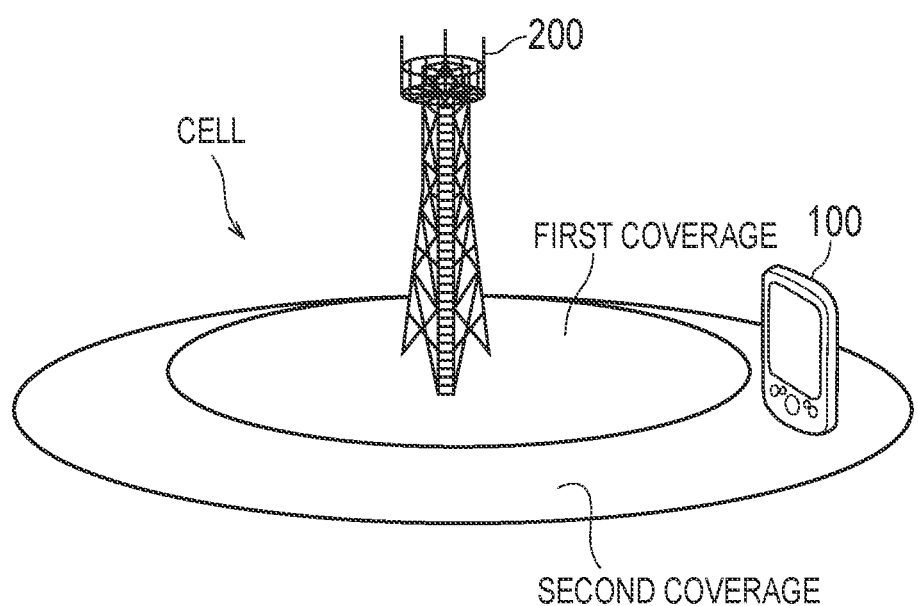
FIG. 7 is a diagram illustrating an application scene of a cell reselection control method according to a first embodiment.

FIG. 7 is a diagram illustrating an application scene of the cell reselection control method according to the first embodiment.

As illustrated in FIG. 7, a cell managed by the eNB 200 has a first coverage and a second coverage outside the first coverage. The first coverage is a coverage (normal coverage) that has not been enhanced by the coverage enhancement function. The second coverage is a portion (enhanced coverage) that is enhanced by the coverage enhancement function. In the first embodiment, it is assumed that the UE 100 that is the eMTC UE or the NB-IoT UE is in the enhanced coverage of the cell in the RRC idle mode.

In the first embodiment, the eNB 200 that manages a cell having the normal coverage and the enhanced coverage transmits (unicasts or broadcasts) a reselection instruction to the UE 100 in the RRC idle mode which is in the enhanced coverage to instruct the UE 100 to reselect neighboring cells different from the cell. For example, the eNB 200 transmits the paging message or the system information block (SIB) that includes the reselection instruction. The repetition may be applied to such transmission. The UE 100 in the enhanced coverage reselects neighboring cells in response to the reception of the reselection instruction from the eNB 200. As a result, it is possible to prevent the UE 100 from being in an incommunicable state while enabling the load distribution on the cell. Note that the eNB 200 may transmit the reselection instruction instructing to reselect the neighboring cells different from the cell in a cell including the normal coverage and the enhanced coverage. In that case, the UE 100 that is in either the normal coverage or the enhanced coverage will receive the reselection instruction, and when the UE 100 that has received the reselection instruction is located in the enhanced coverage, the UE 100 may reselect the neighboring cells according to the reselection instruction. Note that when the UE 100 in the normal coverage receives the reselection instruction, and when the UE 100 moves from the normal coverage to the enhanced coverage, the UE 100 may reselect the neighboring cells according to the reselection instruction.

Note that the reselection instruction may include an indication so that the UE 100 that has received the instruction can determine that the instruction is for the UE 100 that is in the enhanced coverage.

The UE 100 may reselect the neighboring cells belonging to the same frequency as the frequency to which the cell (cell of a transmission source of the reselection instruction) belongs according to the reception of the reselection instruction. Generally, in the cell reselection within the same frequency, the communication between a reselection destination cell and the UE 100 may cause interference with an original cell. However, when the UE 100 is in the enhanced coverage, the UE 100 is in the situation (situation where a path loss is large) where the communication environment is extremely bad, and thus the influence of interference on the original cell is small.

Figure 8:
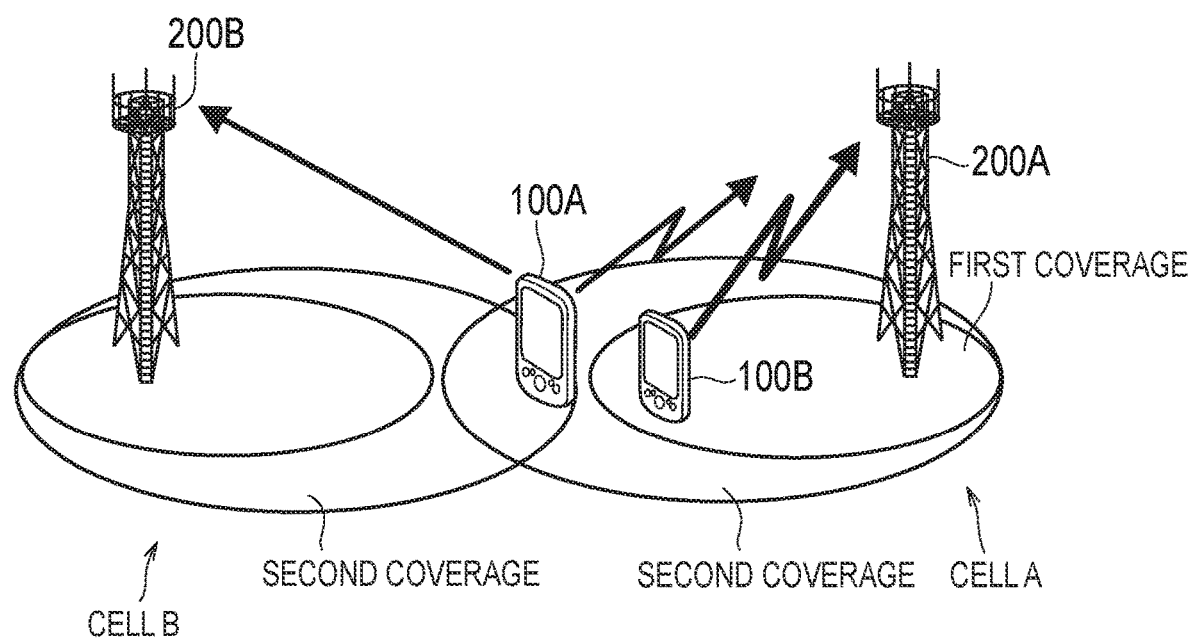
FIG. 8 is a diagram illustrating an operation example according to the first embodiment.

FIG. 8 is a diagram illustrating an example in which the UE 100A in the enhanced coverage (second coverage) of the cell A managed by the eNB 200A reselects the cell B managed by the eNB 200B according to the reselection instruction. As illustrated in FIG. 8, cell A is a cell having a best reception level (reception quality) at a UE 100A, and has the highest ranking of the cell reselection. A cell B is a cell having a second best reception level (reception quality) in the UE 100A, and has the second highest ranking of the cell reselection. Since the path loss between the UE 100A and the cell A (eNB 200A) is large, the radio signal transmitted from the UE 100A to the cell B (eNB 200B) is observed as the small interference power in the cell A (eNB 200A). In addition, the transmission power of UE 100A is in a saturated state. For this reason, the influence of interference that the UE 100A applies to the cell A of the reselection source is small, in particular, the influence of interference from the UE 100A on the desired wave power received by the cell A from the UE 100B in the first coverage (normal coverage) is extremely large.

Further, the enhanced coverage is associated with a plurality of coverage enhancement levels having different degrees of coverage enhancement, as described above. The eNB 200 may transmit the reselection instruction to the UE 100 having a specific coverage enhancement level among the plurality of coverage enhancement levels. In such a case, the reselection instruction may include information specifying the coverage enhancement level of UE 100 that should perform the cell reselection. Alternatively, the reselection instruction may include the RSRP threshold. When the RSRP threshold is specified, the UE 100 determines whether or not to perform the cell reselection according to the comparison result between the RSRP measured by itself and the specified RSRP threshold.

For example, the eNB 200 transmits the reselection instruction by specifying the UE 100 (that is, the communication environment is the worst) having the highest degree of the coverage enhancement among the UEs 100 in the own cell. Thereafter, when its own load on the cell is not sufficiently reduced, the eNB 200 transmits the reselection instruction by specifying the UE 100 having the second highest degree of coverage enhancement. Thereby, the eNB 200 can cause the UE 100 to perform the cell reselection in a stepwise manner from outside to inside of enhanced coverage, for example, until its own load on the cell is sufficiently reduced.

The eNB 200 may transmit, to the UE 100, information (hereinafter, referred to as allowable level difference information) indicating an allowable reception level difference between the own cell and the neighboring cells. The eNB 200 may transmit the allowable level difference information included in the reselection instruction, or may transmit the allowable level difference information to the UE 100 by, for example, the SIB separately from the reselection instruction. When the reception level difference between the current serving cell and the neighboring cells is within the allowable reception level difference, the UE 100 reselects the neighboring cells based on the allowable level difference information. By setting the allowable reception level difference in this manner, it is possible to suppress the UE 100 from reselecting neighboring cells having an extremely poor communication environment as compared with the current serving cell, and as a result, it is possible to efficiently prevent the UE 100 from being in the incommunicable state.

The eNB 200 may separately transmit the allowable level difference information for intra-frequency cell reselection and the allowable level difference information for inter-frequency cell reselection. Specifically, the eNB 200 transmits information indicating a first allowable reception level difference used for reselection of neighboring cells (intra-frequency cell reselection) belonging to the same frequency as the frequency to which the own cell belongs, and information indicating a second allowable reception level difference used for reselection (inter-frequency cell reselection) of neighboring cells belonging to a frequency different from the frequency to which the own cell belongs. For example, the first allowable reception level difference for the intra-frequency cell reselection is set to be smaller than the second allowable reception level difference for the inter-frequency cell reselection. The inter-frequency cell reselection does not cause interference problems.

The eNB 200 may transmit, to the UE 100, a timer value indicating a period during which the own cell is excluded from reselection candidates after the reselection of the neighboring cells. The eNB 200 may transmit the timer value included in the reselection instruction, or may transmit the timer value to the UE 100 by, for example, the SIB, separately from the reselection instruction. After reselecting the neighboring cells in response to the reception of the reselection instruction, the UE 100 excludes an original serving cell (the cell of the transmission source of the reselection instruction) from the reselection candidates during the period indicated by the timer value. As a result, it is possible to avoid a ping-pong phenomenon in which the UE 100 immediately reselects and returns the original serving cell.

Figure 9:
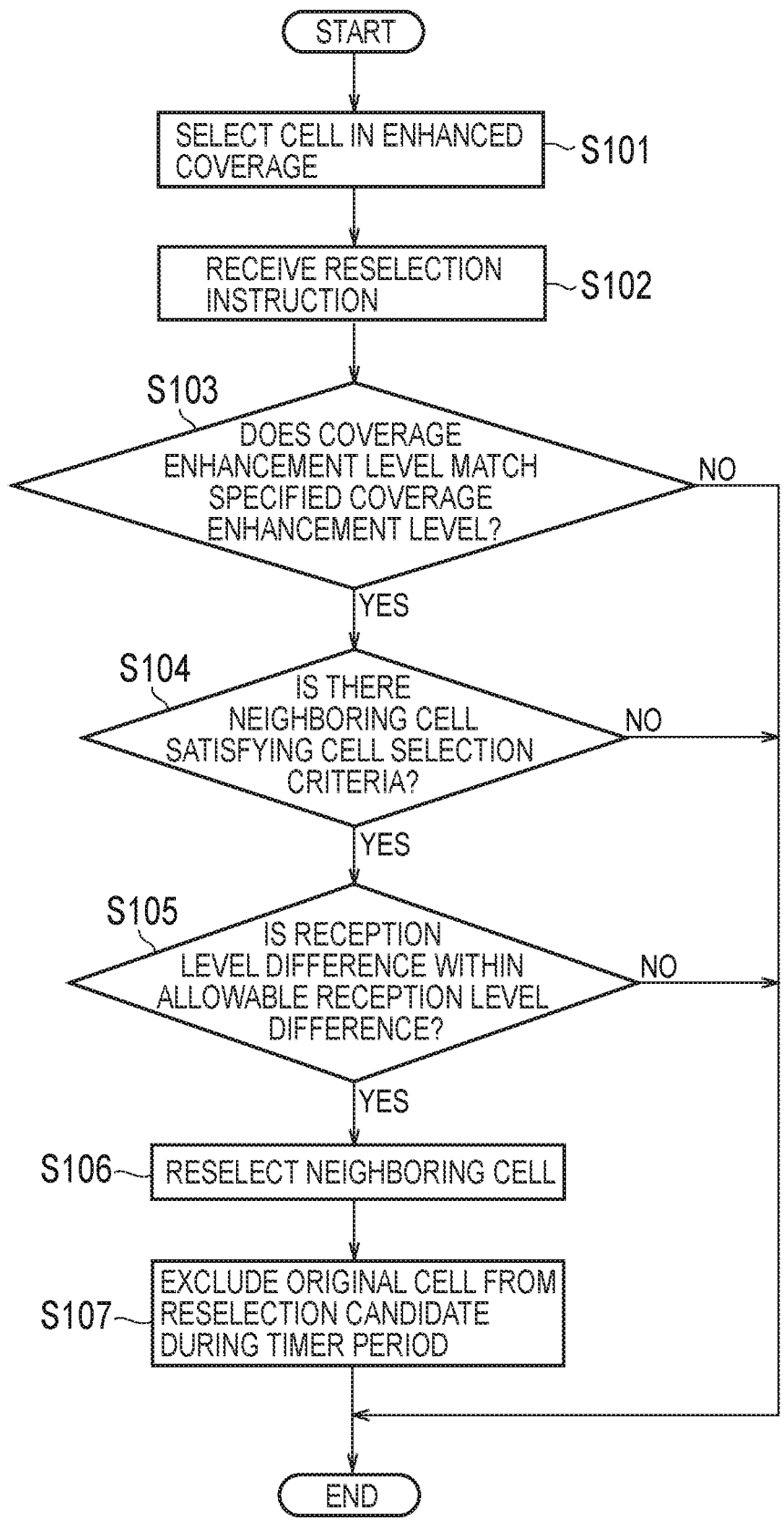
FIG. 9 is a diagram illustrating an example of an operation of the UE according to the first embodiment.

FIG. 9 is a diagram illustrating an example of an operation of the UE 100 according to the first embodiment.

As illustrated in FIG. 9, in step S101, the UE 100 that is the eMTC UE or the NB-IoT UE selects a cell in the RRC idle mode. The UE 100 is in the enhanced coverage for the cell. Specifically, the UE 100 determines its own coverage enhancement level by comparing the measured RSRP with the RSRP threshold values for each coverage enhancement level.

In step S102, the UE 100 receives the reselection instruction from the current serving cell. In addition, the UE 100 receives the allowable level difference information and the timer value from the current serving cell.

In step S103, the UE 100 determines whether or not its own coverage enhancement level matches the coverage enhancement level specified in the reselection instruction. The reselection instruction may specify a range of the coverage enhancement level for the cell reselection. In such a case, the UE 100 determines whether or not its own coverage enhancement level is within the specified range.

If YES in step S103, in step S104, the UE 100 determines whether or not the neighboring cells satisfying the cell reselection criteria are discovered. Specifically, the UE 100 measures the reception levels for each neighboring cell, compares the measured reception levels with a second cell selection criteria (second S-criteria) for the enhanced coverage, and determines whether or not there is the neighboring cell of which reception level is equal to or greater than the second cell selection criteria (second S-criteria).

If YES in step S104, in step S105, the UE 100 calculates the reception level difference between the reception level for the current serving cell and the reception levels for the discovered neighboring cells, and determines whether or not the calculated reception level difference is within the allowable level difference specified from the eNB 200. If the allowable level difference information for the intra-frequency cell reselection and the allowable level difference information for the inter-frequency cell reselection are transmitted separately, the UE 100 selects and uses the allowable level difference information according to whether or not the neighboring cell is the intra-frequency cell or the inter-frequency cell.

If YES in step S105, in step S106, the UE 100 reselects, as a new serving cell, the neighboring cell of which reception level difference is determined to be within the allowable level difference. At that time, the UE 100 starts a timer in which the timer value specified by the eNB 200 is set.

In step S107, the UE 100 excludes the original serving cell from the candidates for the cell reselection while the timer is operating. When the timer expires, the UE 100 adds the original serving cell as the candidate for the cell reselection.

Second Embodiment

Differences between a second embodiment and a first embodiment will be mainly described. An application scene of a cell reselection control method according to the second embodiment is the same as in the first embodiment (see FIG. 7).

In the second embodiment, it is assumed that when a cell is overloaded, access restrictions are set for the cell. In such a case, a UE 100 cannot select the cell as a serving cell.

Also, in such a case, when setting the access restrictions to the own cell, an eNB 200 transmits, by a system information block (system information block type 1), information indicating whether to allow performance of reselection (that is, intra-frequency cell reselection) of neighboring cells belonging to the same frequency as the frequency of the cell during access restriction. Such information is called "intraFreqReselection". The "IntraFreqReselection" is set to be "Allowed" indicating that intra-frequency cell reselection is allowed or "Not Allowed" indicating that intra-frequency cell reselection is prohibited. The UE 100 that has received "intraFreqReselection" set to be the "Not Allowed" prohibits the intra-frequency cell reselection, and allows only inter-frequency cell reselection.

However, when the UE 100 is in an enhanced coverage, as described in the first embodiment, even if the inter-frequency cell reselection is performed, the possibility of causing serious interference is small (see FIG. 8). Therefore, even if the "intraFreqReselection" is set to be the "Not Allowed", the intra-frequency cell reselection is allowed for the UE 100 in the enhanced coverage. That is, the UE 100 in an RRC idle mode which is in the enhanced coverage can reselect a neighboring cell belonging to the same frequency as a current serving cell even if the "intraFreqReselection" is set to be the "Not Allowed". Note that as described above, the UE 100 in the enhanced coverage selects a cell having the best reception level as a serving cell by using a ranking based on the reception level regardless of the intra-frequency and the inter frequency. Therefore, the UE 100 can perform the intra-frequency cell reselection even if the "intraFreqReselection" is set to be the "Not Allowed", and select, as a new serving cell, a cell having a good reception level next to the current serving cell, regardless of the intra-frequency and the inter frequency.

As a result, it is possible to reduce the probability that the UE 100 is in an incommunicable state. In addition, when the new serving cell can be selected by the intra-frequency cell reselection, it is not necessary to perform the inter-frequency cell reselection, so that a processing load and power consumption of the UE 100 can be reduced. For this reason, the UE 100 in the enhanced coverage may execute the intra-frequency cell reselection with priority over the inter-frequency cell reselection.

In the second embodiment, similarly to the first embodiment, it is possible to use a timer for excluding the original serving cell from the reselection candidates after the reselection of the neighboring cell.

Figure 10:
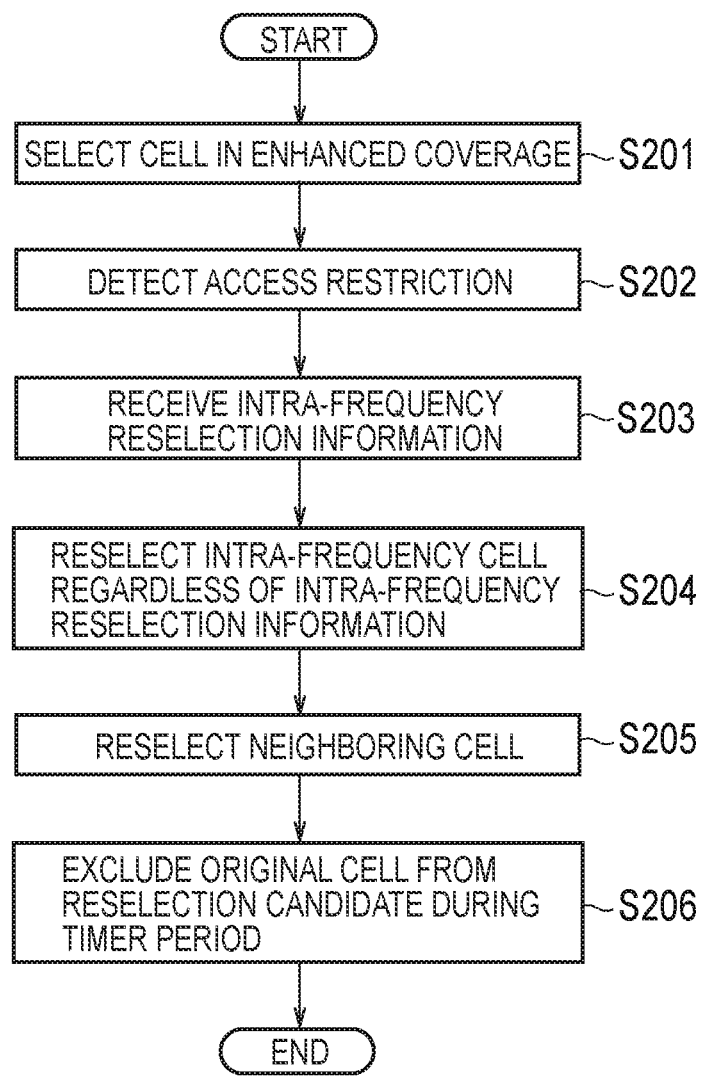
FIG. 10 is a diagram illustrating an example of an operation of a UE according to a second embodiment.

FIG. 10 is a diagram illustrating an example of an operation of the UE 100 according to the second embodiment.

As illustrated in FIG. 10, in step S201, the UE 100 that is an eMTC UE or a NB-IoT UE selects a cell in the RRC idle mode. The UE 100 is in the enhanced coverage for the cell.

In step S202, the UE 100 detects that the current serving cell has set the access restrictions based on the system information block received from the current serving cell. In addition, the UE 100 may be notified of a change in access restriction parameters by a paging message or the like, acquire the system information block, and detect a change (setting) in parameters.

In step S203, the UE 100 receives intra-frequency reselection information (intraFreqReselection) from the current serving cell. Further, the UE 100 receives, from the current serving cell, a timer value for excluding the original serving cell from reselection candidates after the reselection of the neighboring cell.

In step S204, the UE 100 performs the intra-frequency cell reselection regardless of the intra-frequency reselection information. Specifically, the UE 100 performs the intra-frequency cell reselection even when the "intraFreqReselection" is set to be the "Not Allowed". The UE 100 may perform a process of step S204 after confirming that the UE 100 is in the enhanced coverage.

In step S205, the UE 100 reselects, as a new serving cell, the neighboring cell belonging to the same frequency as the current serving cell by the intra-frequency cell reselection. At that time, the UE 100 starts a timer in which the timer value specified by the eNB 200 is set.

In step S206, the UE 100 excludes the original serving cell from candidates for the cell reselection while the timer is operating. When the timer expires, the UE 100 adds the original serving cell as the candidate for the cell reselection.

Modification of Second Embodiment

In this modification, when setting the access restriction to the cell, the eNB 200 transmits, as separate information, first intra-frequency reselection information for the UE 100 that is in the normal coverage, and second intra-frequency reselection information for the UE 100 that is in the enhanced coverage. For example, the first intra-frequency reselection information is normal "intraFreqReselection", and the second intra-frequency reselection information is "intraFreqReselection-CE" which is a newly introduced information element. Similar to the "intraFreqReselection", the "intraFreqReselection-CE" is set to be "Allowed" indicating that the intra-frequency cell reselection is allowed or set to be the "Not Allowed" indicating that the intra-frequency cell reselection is prohibited. The eNB 200 may include the first intra-frequency reselection information (intraFreqReselection) and the second intra-frequency reselection information (intraFreqReselection-CE) in the same SIB, or may include the first intra-frequency reselection information (intraFreqReselection) and the second intra-frequency reselection information (intraFreqReselection-CE) in different SIBs.

The UE 100 in the normal coverage receives and acquires the first intra-frequency reselection information, and UE 100 in the enhanced coverage receives and acquires the second intra-frequency reselection information. That is, the UE 100 selects the intra-frequency reselection information to be acquired according to whether the UE 100 is in the normal coverage or the enhanced coverage. Alternatively, the UE 100 may receive both the first intra-frequency reselection information and the second intra-frequency reselection information regardless of whether the UE 100 is in any coverage, and set or use any intra-frequency reselection information according to whether the UE 100 is in any coverage. Thereby, during the access restrictions for the cell, the setting of the allowance/prohibition of the intra-frequency cell reselection can be made different between the UE 100 in the normal coverage and the UE 100 in the enhanced coverage. For example, the eNB 200 can prohibit the intra-frequency cell reselection during the access restrictions for the UE 100 that is in the normal coverage, and allow the intra-frequency cell reselection during the access restrictions for the UE 100 that is in the enhanced coverage.

Figure 11:
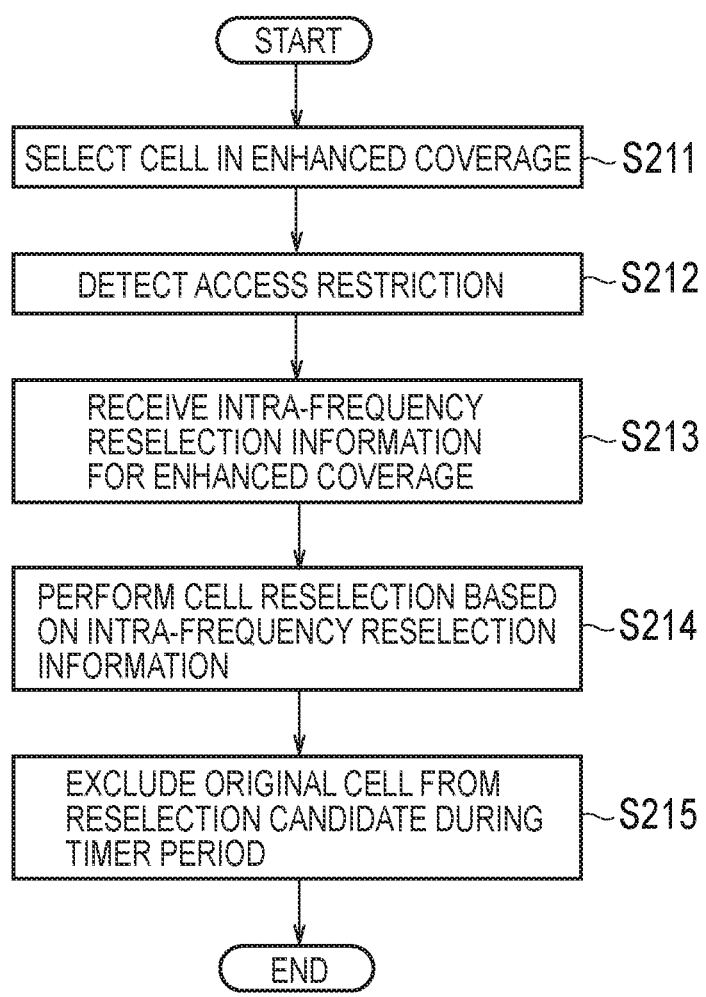
FIG. 11 is a diagram illustrating an example of an operation of a UE according to a modification of the second embodiment.

FIG. 11 is a diagram illustrating an example of an operation of the UE 100 according to the modification of the second embodiment.

As illustrated in FIG. 11, in step S211, the UE 100 that is the eMTC UE or the NB-IoT UE selects the cell in the RRC idle mode. The UE 100 is in the enhanced coverage for the cell.

In step S212, the UE 100 detects that the current serving cell has set the access restrictions based on the system information block received from the current serving cell.

In step S213, the UE 100 acquires the second intra-frequency reselection information (intraFreqReselection-CE) from the current serving cell. Further, the UE 100 receives, from the current serving cell, a timer value for excluding the original serving cell from reselection candidates after the reselection of the neighboring cell.

In step S214, the UE 100 determines whether the intra-frequency cell reselection is allowed based on the second intra-frequency reselection information (intraFreqReselection-CE). The UE 100 may perform a process of step S214 after confirming that the UE 100 is in the enhanced coverage. When the UE 100 is not in the enhanced coverage but in the normal coverage, the UE 100 follows the first intra-frequency reselection information (intraFreqReselection).

Here, description will be made on the assumption that the intra-frequency cell reselection is allowed and the UE 100 has performed the intra-frequency cell reselection. The UE 100 starts the timer in which the timer value specified by the eNB 200 is set.

In step S215, the UE 100 excludes the original serving cell from the candidates for the cell reselection while the timer is operating. When the timer expires, the UE 100 adds the original serving cell as the candidate for the cell reselection.

Other Embodiments

In the above-described embodiment, the LTE system is exemplified as the mobile communication system. However, the present invention is not limited to the LTE system. The operation according to the above-described embodiment may be applied to the mobile communication systems (for example, 5th generation mobile communication system) other than the LTE system.

A program for causing a computer to execute each processing performed by the UE 100 and the eNB 200 may be provided. In addition, the program may be recorded on a computer readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing performed by the UE 100 and the eNB 200 and a processor that executes the program stored in the memory may be provided.

APPENDIX 1

1. Introduction

In this appendix, the details of CEL-based access class barring and the load balancing mechanism are discussed.

2. Discussion 2.1. Assumptions
2.1.1. Deployment Scenario

Figure 12:
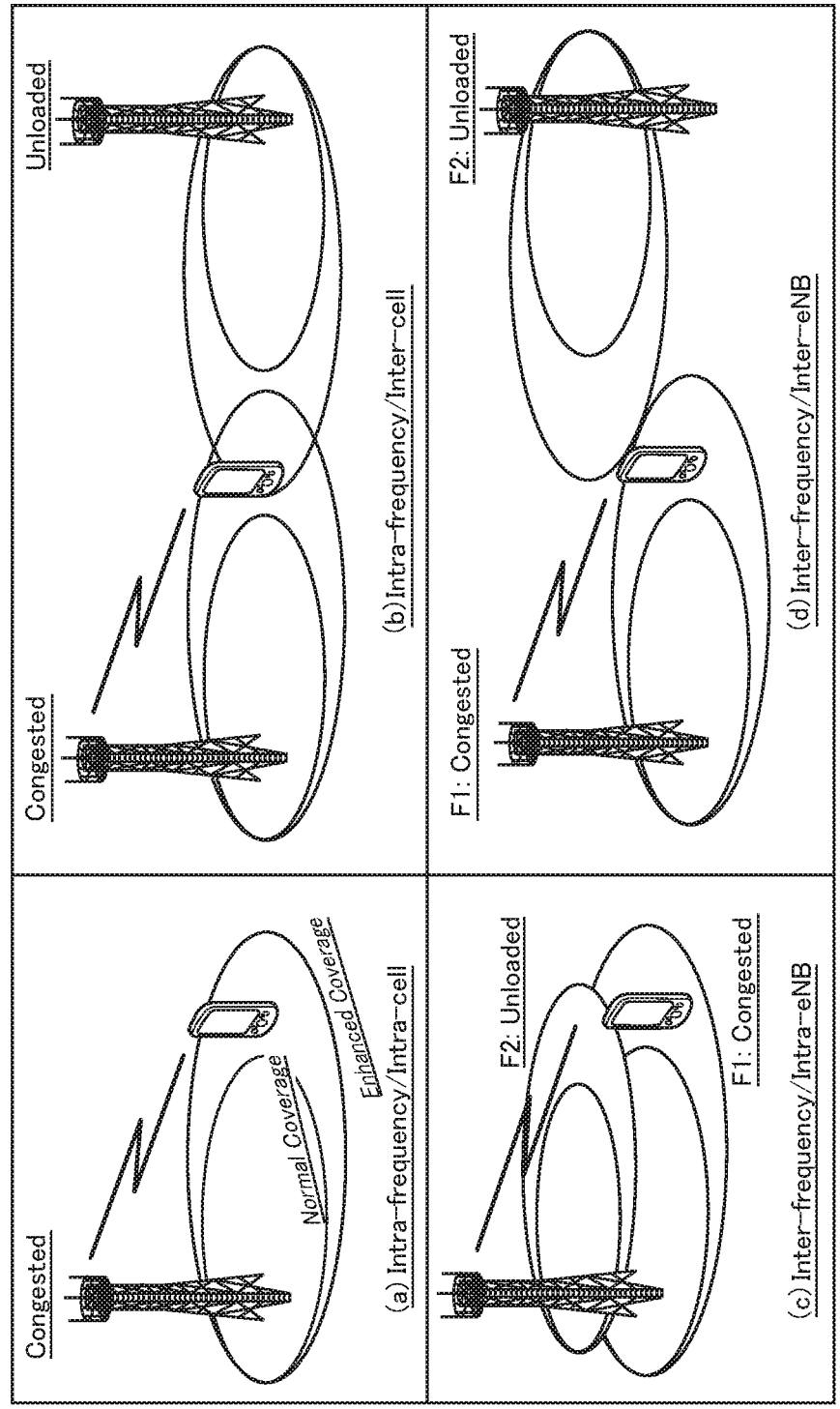
FIG. 12 is a diagram related to an appendix.

FIG. 12 shows deployment scenarios. Note that FIG. 12 (c) and FIG. 12 (d) may be considered as same model.

Before discussing solutions, it should be first identified the deployment scenario that needs the access/load control of idle mode UEs. The possible scenarios may be categorized in terms of intra-/inter-frequency and intra-/inter-cell/eNB, as shown in FIG. 12.

The scenario (a) of FIG. 12 only considers a single cell in an area where the UE is located, while the other scenarios assume multiple cells are available for the UE. The UE is located in the enhanced coverage of the congested cell, since the cell is considered as the highest ranked cell. It may be assumed in all the scenarios in FIG. 12, i.e., (a)~(d), that the congested cell needs to increase the resource availability by means of the solution for access/load control of the idle UE in CE.

Proposal 1: RAN2 should agree that a viable solution should increase the resource availability of the congested cell.

2.1.2. Possibility of Load Balancing Before Access Barring

If Proposal 1 is agreeable, there could be a couple of options to solve the problem, the access barring of the congested cell and the load balancing with the unload cell, as intended in FIG. 12.

The CE-based access class baring is considered a promising solution since it was given as an example in the WID. It's expected to mitigate an extremely overloaded condition, but the unfairness problem was pointed out in the last discussion. The unfairness problem occurs when the UE, which is authorized by the NW, e.g., due to its subscription, cannot access the cell due while camped in CE mode while another UE with the same access class in normal coverage are allowed to initiate access. Considering that most MTC devices are stationary in nature, the problem becomes more serious and may cause customer dissatisfaction.

Observation 1: CE-based access class barring will be beneficial to avoid the extremely overloaded condition, but it may result in customer complaints due to the unfairness condition.

Although the use of CE-based access class barring is eventually up to NW implementation and/or operator's deployment policy, the benefits and drawbacks of this feature must also be considered before it is introduced from the user's perspectives.

Proposal 2: RAN2 should discuss whether the CE-based access class barring is really useful, from the perspectives of NW operation and user experience.

On the other hand, RAN2 should also consider the using load balancing mechanisms for idle mode UEs which already contain various configurable parameters i.e., the absolute priority, the dedicated priority, the offsets and the redistribution procedure. However, they were not introduced with the use case for UE in CE mode since they only follow the ranking procedure.

Regardless of whether the access class barring is introduced, RAN2 should at least consider if load balancing of idle mode UEs can provide sufficient control to reduce the burden on the network, before any access control is applied.

Proposal 3: RAN2 should discuss the use of idle mode load balancing mechanisms, before jumping to the conclusion that access restriction is the only viable solution.

2.2.: Idle Mode Load Balancing
2.2.1.: Cell/Frequency-Specific Offsets

The UE in normal coverage applies the ranking mechanism for intra-frequency and equal priority inter-frequency cell reselection. In addition, the UE in CE only follows the ranking mechanism regardless of whether intra-frequency or inter-frequency cell reselection. The criterion R is defined as;

$$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM} \quad \text{[formula 1]}$$

whereby Qoffset is equal to Qoffsets,n for intra-frequency and Qoffsets,n plus Qoffsetfrequency for inter-frequency.

Qoffset, ranged between −24 dB and +24 dB, may be used for the network optimizations including the load balancing between cells and/or frequencies as a static control manner.

Observation 2: The existing Qoffset may be used for static load balancing.

However, the use case for improved access/load control on this WI is assumed to need dynamic control, since the example of solution in WID i.e., CE-based access class barring, implies the access barring is applied temporarily.

Proposal 4: RAN2 should agree that the solutions for improved access/load control are assumed to require dynamic control of idle mode UEs, i.e., applicable for a short term.

The load balancing with Qoffset is not intended for such a dynamic control since the change of configuration may need to consider other configurations, e.g., the absolute priority for UEs in normal coverage, and also affect the neighbour cells' system information. So, some enhancements will be necessary if the solution relies on Qoffset.

Observation 3: Qoffset-based may need to be enhanced, if it's a possible solution for the improved access/load control.

2.2.2. Inter-Frequency Load Redistribution

The inter-frequency redistribution procedure was introduced in Rel-13 for load balancing in multi-carrier deployments. It redistributes the UEs to another frequency with a network-defined probability. The choice of UEs for redistribution is according to IMSI of UEs, so it ensures not perfect but relatively fairness of UEs. The trigger is designed for two use cases, i.e., the continuous triggering and the one-shot triggering with Paging, so the inter-frequency redistribution procedure has native support of dynamic load control.

Observation 4: The inter-frequency redistribution procedure is NW-controlled method with a good fairness of UEs and the dynamic load control of idle mode UEs.

However, a couple of problems could be seen in this procedure;

Only applicable to inter-frequency redistribution; It could be assumed that the UE in CE only detects less number of other frequencies for redistribution, since the best-ranked cell for this UE still needs the enhanced coverage.

Using the highest-priority concept for the redistribution target cell/frequency; It means the current mechanism is applicable to only UEs in normal coverage, since the UE in CE disregards the priority and follows the ranking mechanism.

Proposal 5: RAN2 should agree to enhance the inter-frequency redistribution procedure for the improved load control of idle mode UEs in CE.

2.2.3. Other Load Balancing Solutions

The concept of RSRP based access probability is proposed in [6]. In our understanding, it defines the access probabilities that are somehow associated with each RSRP level. This solution appears to have the benefit of a unified solution not only load balancing but also for access barring, depending on NW configuration, so it seems be worth further investigation. However, it is not clear how beneficial this is for Rel-15 UEs compared to legacy UEs.

Another possibility is for the eNB to broadcast an indication that tells the UE in CE to move to another cell if possible. It's a kind of "cell barred", but applicable only for CE region and may be allowing the UE to stay in this cell if any other suitable cell is not found.

2.3. CE-Based Access Class Barring

The detailed mechanisms of CEL-based access class barring were proposed. In our understanding, the common views and contradictions are seen, in terms of;

The barring parameters per CEL are provided in SIB;

FFS: Whether per AC, whether per PLMN or per cell, and whether through SIB2 or SIB14.

The modification of barring parameters is notified through Paging;

FFS: Whether with the existing eab-ParamModification or a new IE.

On the other hand, there are two types of access control concepts as the following in the current specification, i.e., such as EAB or ACDC. The major difference between the two types is whether the UE may reselect another cell (from the barred cell) or shall stay on this cell (i.e., the access-restricted cell). It's not crystal clear which type of CEL-based access barring is preferable.

Observation 5: It's not yet clear whether the CEL-based access class barring is considered as a kind of cell barring or cell access restriction.

It was pointed out in a contribution that access probability of Rel-15 UE should not be degraded compared to legacy UE. With cell access restriction, the UE will not have an opportunity to initiate a connection, but if only a cell is barred, it may still be possible to make a connection through another cell. Therefore, CE-based access barring should be based on cell barring.

Proposal 6: If CE-based access class barring is introduced, the UE should consider the cell as barred, i.e., a CEL of the cell is barred.

2.3.1.2 UL interference when reselects to the second highest ranked cell Regardless of Proposal 3, further consideration of intra-frequency inter-cell interference is necessary, i.e., for the case (b) in FIG. 12, since the load balancing implies that the UE may reselect the second highest cell.

Figure 13:
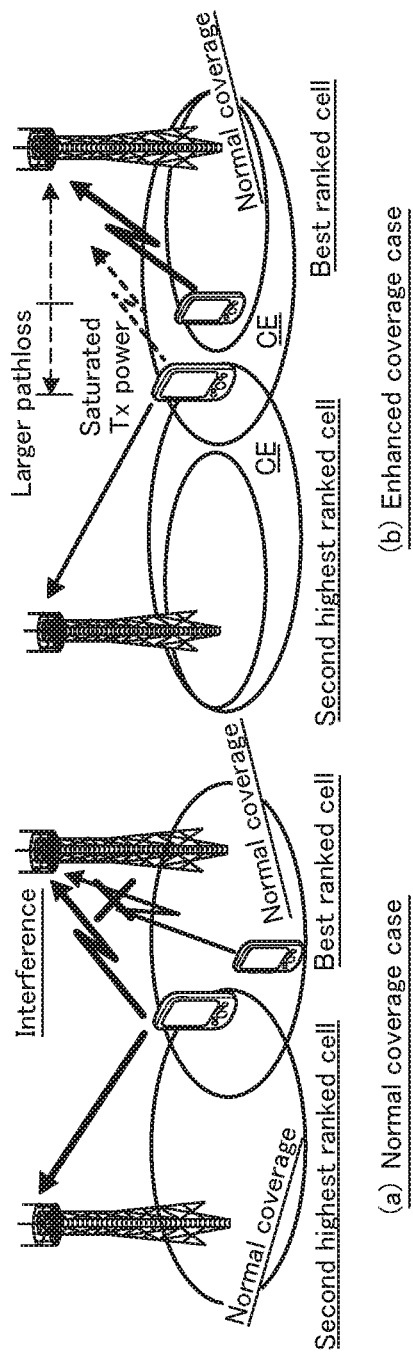
FIG. 13 is a diagram related to an appendix.

In general, it's problematic if the UE connects with the second highest ranked cell, since the best ranked cell (on the same frequency) experiences excessive UL interference due to UE's higher Tx power for longer distance connection (case (a) in FIG. 13). Thus, the current specification has intraFreqReselection in SIB1 to indicate whether to allow the intra-frequency cell reselection when the best-ranked cell is barred. It's true for the normal coverage case.

Observation 6: For normal coverage, it causes excessive UL interference if the UE reselects the second highest ranked cell.

In case of enhanced coverage, however, the condition is a bit different since the coverage extension is realized by not much higher Tx power but repetition, i.e., the Tx power could be already saturated when the UE moves from normal coverage to enhanced coverage.

It would be considered that the intention of access/load control for the UE in CE is to increase the resource availability for the UEs that are in normal coverage of the congested cell, whereby the UEs in normal coverage is always closer to the serving cell than the UEs in CE, as shown in (b) of FIG. 13. In other words, the UE in CE obviously has larger pathloss.

Assuming the UE was originally in CE of the best-ranked cell and now reselects the second highest ranked cell, it may appear to increase the UL interference to the best-ranked cell. However, in terms of the receiving signal strength at the best-ranked cell, UL interference from the aggressor UE (in the second highest ranked cell) may be smaller than the desired UL signal from an UE in its normal coverage, due to the reasons explained above, i.e., Tx power saturation and larger pathloss for a specific UL resource. The total interference power however may be larger due to repetitions. In this sense, the UL interference is not a critical problem in the enhanced coverage, compared to the case of normal coverage.

Observation 7: For some cases in enhanced coverage, the UL interference is not a critical problem even if the UE moves from the congested cell to the unloaded cell.

Therefore, it should be considered that the UE in CE may reselect the second highest ranked cell, even if it's an intra-frequency cell, when the best-ranked cell is congested. As a simple example, an additional intraFreqReselection (i.e., intraFreqReselection-CE) is introduced.

Proposal 7: RAN2 should agree that the UE in CE is allowed to reselect the second highest ranked cell even if it's an intra-frequency cell, when the best-ranked cell is congested.

The invention claimed is:

1. A cell reselection control method comprising:
    transmitting, by a base station configured to manage a cell having a first coverage and a second coverage as a portion enhanced more than the first coverage, to a radio terminal under the cell, a reselection instruction which instructs to reselect a neighboring cell different from the cell;
    determining, by the radio terminal, whether the radio terminal is in the first coverage or the second coverage based on one or more cell signal thresholds associated with the second coverage;
    receiving, by the radio terminal in RRC idle mode, the reselection instruction when the radio terminal is in the second coverage;
    reselecting, by the radio terminal in the RRC idle mode, the neighboring cell according to the reselection instruction when the radio terminal is in the second coverage; and
    ignoring, by the radio terminal in the RRC idle mode, the reselection instruction when the reselection instruction is received by the radio terminal in the first coverage.

2. The cell reselection control method according to claim 1, wherein
    in the transmitting the reselection instruction, the base station transmits the reselection instruction to the radio terminal in the RRC idle mode which is in the second coverage, and
    in the reselecting the neighboring cell, the radio terminal which is in the second coverage reselects the neighboring cell according to reception of the reselection instruction.

3. The cell reselection control method according to claim 1, wherein
    if the radio terminal receives the reselection instruction when the radio terminal is in the first coverage, in the reselecting the neighboring cell, the radio terminal reselects the neighboring cell according to the reselection instruction when the radio terminal moves from the first coverage to the second coverage.

4. The cell reselection control method according to claim 1, wherein
    the reselecting the neighboring cell includes reselecting, by the radio terminal, the neighboring cell belonging to a same frequency as a frequency to which the cell belongs.

5. The cell reselection control method according to claim 4, wherein
    the transmitting the information indicating the allowable reception level difference includes transmitting, by the base station, information indicating a first allowable reception level difference used for the reselection of the neighboring cell belonging to the same frequency as the frequency to which the cell belongs and information indicating a second allowable reception level difference used for the reselection of the neighboring cell belonging to a frequency different from the frequency to which the cell belongs.

6. The cell reselection control method according to claim 1, wherein
    the second coverage is associated with a plurality of coverage enhancement levels having different degrees of coverage enhancement, and
    the transmitting the reselection instruction includes transmitting, by the base station, the reselection instruction to the radio terminal of a specific coverage enhancement level among the plurality of coverage enhancement levels.

7. The cell reselection control method according to claim 1, wherein
    the transmitting the reselection instruction includes transmitting, by the base station, information indicating an allowable reception level difference between the cell and the neighboring cell to the radio terminal, and
    the reselecting the neighboring cell includes reselecting, by the radio terminal, the neighboring cell when a reception level difference between the cell and the neighboring cell is within the allowable reception level difference.

8. The cell reselection control method according to claim 1, further comprising:
    transmitting, by the base station, to the radio terminal, a timer value indicating a period during which the cell is excluded from a reselection candidate after the neighboring cell is reselected; and
    excluding, by the radio terminal, the cell from the reselection candidate during the period indicated by the timer value after the neighboring cell is reselected according to the reception of the reselection instruction.

9. A cell reselection control method comprising:
    transmitting, by a base station configured to manage a cell having a first coverage and a second coverage as a portion enhanced more than the first coverage, intra-frequency reselection information indicating that a reselection of a neighboring cell belonging to a same frequency as a frequency of the cell is not allowed to be performed during an access restriction when the access restriction to the cell is set;
    determining, by the radio terminal, whether the radio terminal is in the first coverage or the second coverage based on one or more cell signal thresholds associated with the second coverage;
    reselecting, by the radio terminal in an RRC idle mode which is in the second coverage, the neighboring cell belonging to the same frequency as the frequency of the cell regardless of the intra-frequency reselection information, even when the radio terminal which is in the second coverage and in the RRC idle mode receives the intra-frequency reselection information; and performing a control to not reselect the neighboring cell belonging to the same frequency as the frequency of the cell, by the radio terminal in the RRC idle mode which is in the first coverage, when the radio terminal which is in the first coverage receives the intra-frequency reselection information.

10. The cell reselection control method according to claim 9, further comprising:

transmitting, by the base station, to the radio terminal, a timer value indicating a period during which the cell is excluded from a reselection candidate after the neighboring cell is reselected; and excluding, by the radio terminal, the cell from the reselection candidate during the period indicated by the timer value after the neighboring cell is reselected.

* * * * *